(12) United States Patent
Ravid et al.

(10) Patent No.: US 8,526,528 B2
(45) Date of Patent: *Sep. 3, 2013

(54) BEAMFORMING IN MIMO COMMUNICATION SYSTEMS

(75) Inventors: Rafi Ravid, Neve Monosson (IL); Zohar Montekyo, M.P. Negev (IL); Ahikam Aharony, Tel Mond (IL)

(73) Assignee: Provigent Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,370

(22) Filed: May 18, 2012

(65) Prior Publication Data

US 2012/0230444 A1 Sep. 13, 2012

Related U.S. Application Data

(63) Continuation of application No. 12/355,823, filed on Jan. 19, 2009, now Pat. No. 8,204,143.

(60) Provisional application No. 61/022,551, filed on Jan. 22, 2008.

(51) Int. Cl.
*H04B 7/02* (2006.01)

(52) U.S. Cl.
USPC ........... 375/267; 375/226; 375/260; 375/295; 375/299; 375/316; 375/327; 375/340; 375/347; 375/371; 375/376; 455/101; 455/132; 455/260; 455/296; 455/500; 455/516; 455/562.1; 370/334; 370/516; 327/147; 327/156

(58) Field of Classification Search
USPC .................. 375/226, 260, 267, 295, 299, 316, 375/327, 340, 347, 371, 376; 455/101, 132, 455/260, 296, 500, 516, 562.1; 370/334, 370/516; 327/147, 156
See application file for complete search history.

(56) References Cited

U.S. PATENT DOCUMENTS

| | | |
|---|---|---|
| 5,608,410 A | 3/1997 | Stilp et al. |
| 5,631,896 A | 5/1997 | Kawase et al. |
| 5,740,211 A | 4/1998 | Bedrosian |
| 6,195,330 B1 | 2/2001 | Sawey et al. |
| 6,611,942 B1 | 8/2003 | Battistello et al. |
| 6,687,217 B1 | 2/2004 | Chow et al. |
| 6,937,592 B1 | 8/2005 | Heath et al. |
| 7,043,271 B1 | 5/2006 | Seto et al. |
| 7,729,233 B2 | 6/2010 | Webster et al. |

(Continued)

OTHER PUBLICATIONS

International Application PCT/IL2008/001620 Search Report and Written Opinion dated May 7, 2009.

(Continued)

*Primary Examiner* — Leon Flores
(74) *Attorney, Agent, or Firm* — Sterne, Kessler, Goldstein & Fox P.L.L.C.

(57) ABSTRACT

A communication terminal includes first and second transmitters, which are coupled to produce respective first and second Radio Frequency (RF) signals that are phase-shifted with respect to one another by a beamforming phase offset, and to transmit the RF signals toward a remote communication terminal. The terminal includes a reception subsystem including first and second receivers and a phase correction unit. The first and second receivers are respectively coupled to receive third and fourth RF signals from the remote communication terminal. The phase correction unit is coupled to produce, responsively to the third and fourth RF signals, a phase correction for correcting an error component in the beamforming phase offset.

20 Claims, 4 Drawing Sheets

(56) References Cited

U.S. PATENT DOCUMENTS

| | | |
|---|---|---|
| 7,876,840 B2 | 1/2011 | Tong et al. |
| 8,126,408 B2 | 2/2012 | Ahrony et al. |
| 2004/0071104 A1 | 4/2004 | Boesel et al. |
| 2005/0141658 A1 | 6/2005 | Tanaka et al. |
| 2005/0170831 A1* | 8/2005 | Magee et al. ............ 455/434 |
| 2005/0174981 A1 | 8/2005 | Heath et al. |
| 2005/0180314 A1 | 8/2005 | Webster et al. |
| 2006/0023669 A1 | 2/2006 | Yamaura et al. |
| 2006/0079290 A1 | 4/2006 | Seto et al. |
| 2006/0125687 A1 | 6/2006 | Greeley |
| 2006/0135077 A1 | 6/2006 | Kim |
| 2006/0193392 A1 | 8/2006 | Kim et al. |
| 2006/0209979 A1 | 9/2006 | Sandell et al. |
| 2006/0252386 A1* | 11/2006 | Boer et al. ............ 455/101 |
| 2007/0010209 A1 | 1/2007 | Nishizaki et al. |
| 2007/0037519 A1 | 2/2007 | Kim et al. |
| 2007/0098092 A1 | 5/2007 | Mitran |
| 2007/0105508 A1 | 5/2007 | Tong et al. |
| 2007/0201575 A1 | 8/2007 | Ariyavisitakul et al. |
| 2007/0207730 A1 | 9/2007 | Nguyen et al. |
| 2008/0130726 A1 | 6/2008 | Sofer et al. |
| 2009/0049361 A1 | 2/2009 | Koren et al. |
| 2010/0120460 A1 | 5/2010 | Karlsson et al. |

OTHER PUBLICATIONS

Ericsson AB, "Capacity without ties; Mini-Link microwave transmission soulution," EN/LZT 712 0117 R2, Molndal, Sweden, 2005.

Alamouti, "A Simple Transmit Diversity Technique for Wireless Communication", IEEE Journal on Select Areas in Communications, vol. 16, No. 8, pp. 1451-1458, Oct. 1998.

Tarokh et al., "Space-Time Codes for High Data Rate Wireless Communication; Performance Analysis and Code Construction", IEEE Transactions on Information Theory (44:2), pp. 744-765, Mar. 1998.

International Application PCT/IL09/00020 Search Report Written Opinion dated Apr. 21, 2009.

* cited by examiner

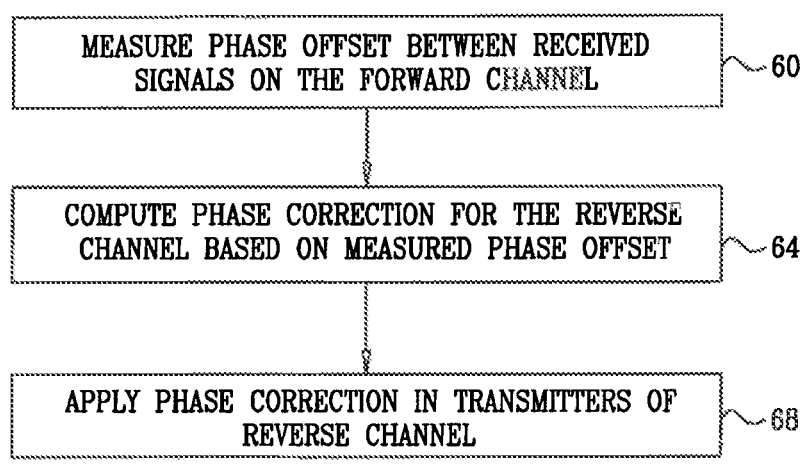

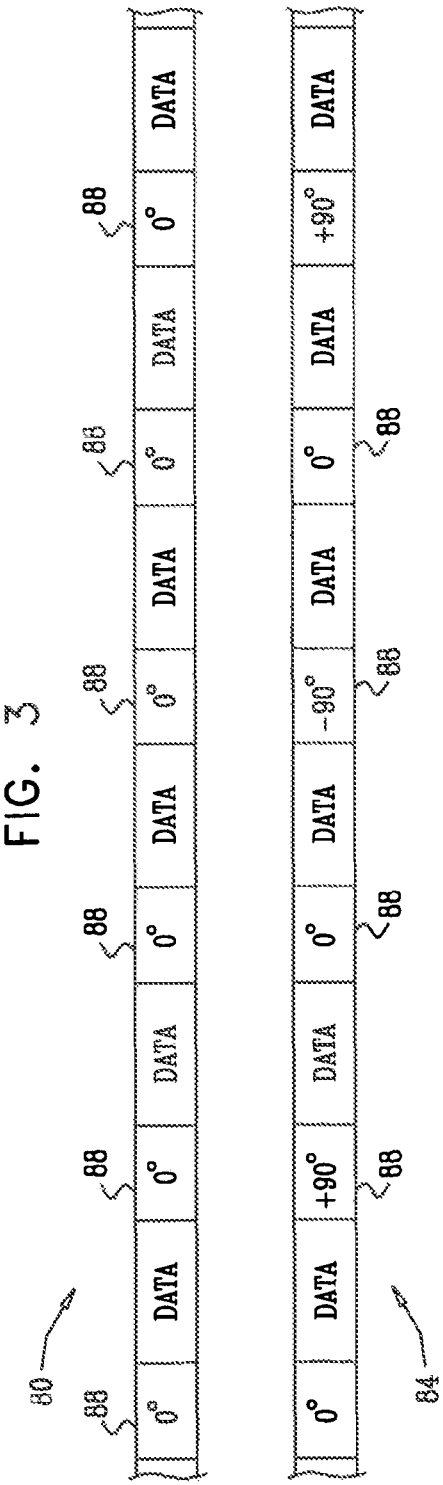

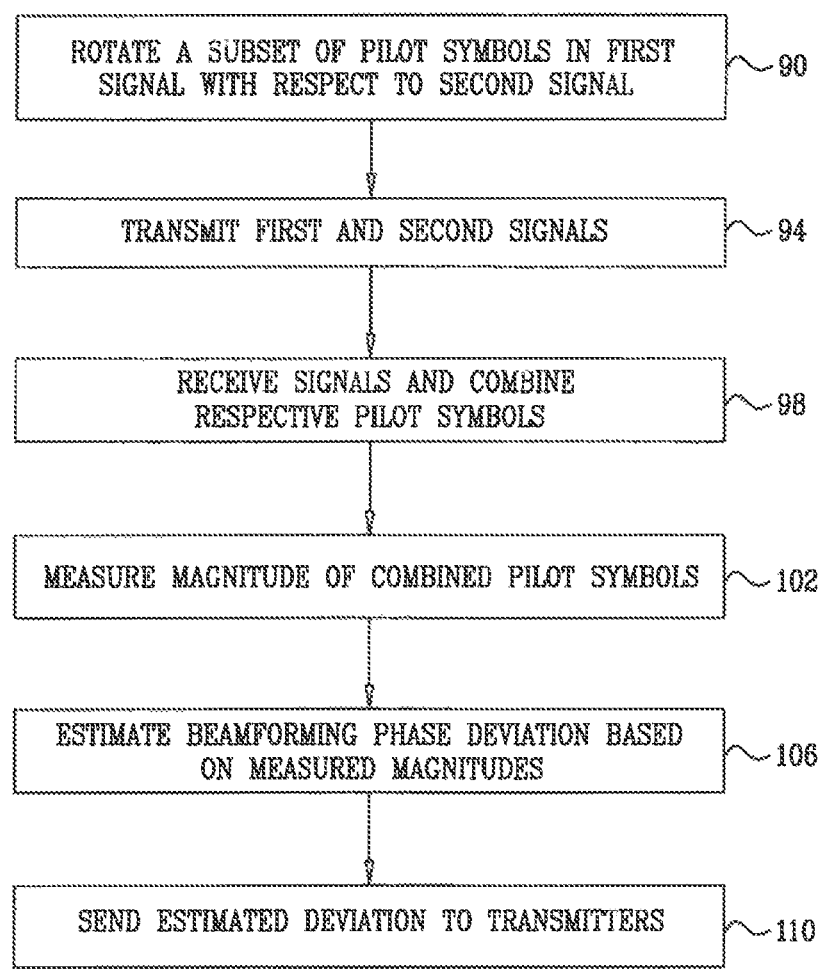

BEAMFORMING IN MIMO COMMUNICATION SYSTEMS

CROSS-REFERENCE TO RELATED APPLICATIONS

This application is a continuation of U.S. application Ser. No. 12/355,823, filed on Jan. 19, 2009, now allowed, which claims the benefit of U.S. Provisional Application No. 61/022,551, filed Jan. 22, 2008, each of which is incorporated herein by reference in its entirety.

FIELD OF THE INVENTION

The present invention relates generally to wireless communication systems, and particularly to methods and systems for beamforming in Multiple-Input Multiple-Output (MIMO) communication systems.

BACKGROUND OF THE INVENTION

Some communication systems, commonly referred to as Multiple-Input Multiple-Output (MIMO) systems, transmit and receive simultaneously using multiple transmit and receive antennas. Some MIMO techniques transmit phase-shifted replicas of a transmitted signal from multiple antennas to produce a directional, high-gain transmission. These techniques are often referred to as Beam Forming (BF) techniques. The phase differences between the signals transmitted from the different antennas determine the direction of the transmission. Thus, beamforming systems are often sensitive to undesired phase and frequency offsets between signals.

Several methods are known in the art for measuring and/or correcting phase and frequency offsets in MIMO systems. For example, U.S. Patent Application Publication 2006/0135077, whose disclosure is incorporated herein by reference, describes a multi-transceiver system adapted to estimate a frequency offset on the basis of a test signal and a reference signal. Transceivers in the multi-transceiver system are adapted to transmit signals compensated with the frequency offsets.

U.S. Patent Application Publication 2006/0209979, whose disclosure is incorporated herein by reference, describes a method of tracking receiver frequency offsets in a receiver of a MIMO system. The frequency offsets due to each of a number of receiver sub-systems are estimated by monitoring frequency offsets on a number of channels or sub-carriers on different frequencies. The channel frequency offsets are preferably estimated by detecting the phase rotation between adjacent pilot symbols on each respective channel.

SUMMARY OF THE INVENTION

Embodiments of the present invention provide a communication terminal, including:

first and second transmitters, which are coupled to produce respective first and second Radio Frequency (RF) signals that are phase-shifted with respect to one another by a beamforming phase offset, and to transmit the RF signals toward a remote communication terminal; and a reception subsystem, including:

first and second receivers, which are respectively coupled to receive third and fourth RF signals from the remote communication terminal; and a phase correction unit, which is coupled to produce, responsively to the third and fourth RF signals, a phase correction for correcting an error component in the beamforming phase offset.

In some embodiments, the first and second receivers are respectively coupled to down-convert the third and fourth RF signals to produce first and second received signals, and the phase correction unit is coupled to measure a phase shift between the first and second received signals and to compute the phase correction responsively to the measured phase shift. In an embodiment, the phase correction unit includes a Differential Phase-Locked Loop (DPLL), which is coupled to measure the phase shift. In another embodiment, the phase correction unit is coupled to produce first and second baseband signals that include the phase correction, and the first and second transmitters are respectively coupled to process the first and second baseband signals so as to produce the first and second RF signals. In a disclosed embodiment, the phase correction unit is coupled to determine a phase shift between the third and fourth RF signals, and to produce the phase correction proportionally to the measured phase shift.

In some embodiments, the communication terminal includes first and second Local Oscillator (LO) generation units, which are coupled to produce respective first and second LO signals that are unsynchronized with one another, and the first and second transmitters are respectively coupled to produce the first and second RF signals using the first and second unsynchronized LO signals. In an embodiment, the first and second receivers are coupled to process the third and fourth RF signals using respectively the first and second unsynchronized LO signals.

In another embodiment, the communication terminal includes first and second Local Oscillator (LO) generation units, which are coupled to produce respective first and second LO signals that are locked to a common reference clock signal, and the first and second transmitters are respectively coupled to produce the first and second RF signals using the first and second LO signals. In an embodiment, the first and second receivers are coupled to process the third and fourth RF signals using respectively the first and second LO signals.

There is additionally provided, in accordance with an embodiment of the present invention, a communication system, including:

transmission baseband circuitry, which is coupled to produce first and second baseband signals with a relative beamforming phase therebetween, the first baseband signal including a first sequence of first pilot symbols, and the second baseband signal including a second sequence of second pilot signals, such that each first pilot signal is transmitted concurrently with a corresponding second pilot signal, each of the first and second sequences includes at least first and second interleaved sub-sequences, such that each of the first pilot symbols in the first sub-sequence has a first phase offset relative to the corresponding second pilot signal, and each of the first pilot symbols in the second sub-sequence has a second phase offset, which is different from the first phase offset, relative to the corresponding second pilot signal; and first and second transmitters, which are respectively coupled to process the first and second baseband signals so as to produce and transmit first and second Radio Frequency (RF) signals.

In some embodiments, the system further includes first and second receivers, which are respectively coupled to receive first and second combinations of the first and second transmitted RF signals and to produce respective first and second received signals; and reception baseband circuitry, which is coupled to combine the first and second received signals to produce a composite signal, to measure respective first and second magnitudes of the pilot symbols belonging to the first and second sub-sequences in the composite signal, to process the first and second magnitudes so as to compute the relative beamforming phase, and to provide the beamforming phase to the transmission baseband circuitry.

In another embodiment, the reception baseband circuitry is coupled to combine the first and second received signals by applying Maximum Ratio Combining (MRC). In yet another embodiment, the first phase offset includes φ degrees, the second phase offset includes −φ degrees, and each of the first and second sequences further includes a third sub-sequence, such that each of the first pilot symbols in the third sub-sequence has no phase offset with respect to the corresponding second pilot signal.

There is also provided, in accordance with an embodiment of the present invention, a communication terminal, including:

first and second receivers, which are respectively coupled to receive first and second combinations of first and second Radio Frequency (RF) signals transmitted from respective first and second transmitters, and to process the first and second combinations to produce respective first and second received signals, such that the RF signals have a relative beamforming phase therebetween, the first RF signal including a first sequence of first pilot symbols, and the second RF signal including a second sequence of second pilot signals, such that each first pilot signal is transmitted concurrently with a corresponding second pilot signal, each of the first and second sequences includes at least first and second interleaved sub-sequences, such that each of the first pilot symbols in the first sub-sequence has a first phase offset relative to the corresponding second pilot signal, and each of the first pilot symbols in the second sub-sequence has a second phase offset, which is different from the first phase offset, relative to the corresponding second pilot signal; and a modem, which is coupled to combine the first and second received signals to produce a composite signal, to measure respective first and second magnitudes of the pilot symbols belonging to the first and second sub-sequences in the composite signal, to process the first and second magnitudes so as to compute the relative beamforming phase, and to provide the beamforming phase to the first and second transmitters.

There is further provided, in accordance with an embodiment of the present invention, a method for communication, including:

producing first and second Radio Frequency (RF) signals that are phase-shifted with respect to one another by a beamforming phase offset;

transmitting the first and second RF signals toward a remote communication terminal;

receiving third and fourth RF signals from the remote communication terminal; and processing the third and fourth RF signals so as to produce a phase correction for correcting an error component in the beamforming phase offset.

There is also provided, in accordance with an embodiment of the present invention, a method for communication, including:

producing first and second baseband signals with a relative beamforming phase therebetween, the first baseband signal including a first sequence of first pilot symbols, and the second baseband signal including a second sequence of second pilot signals, such that each first pilot signal is transmitted concurrently with a corresponding second pilot signal, each of the first and second sequences includes at least first and second interleaved sub-sequences, such that each of the first pilot symbols in the first sub-sequence has a first phase offset relative to the corresponding second pilot signal, and each of the first pilot symbols in the second sub-sequence has a second phase offset, which is different from the first phase offset, relative to the corresponding second pilot signal;

processing the first and second baseband signals so as to produce and transmit first and second Radio Frequency (RF) signals;

receiving first and second combinations of the first and second transmitted RF signals so as to produce respective first and second received signals;

combining the first and second received signals to produce a composite signal, and measuring respective first and second magnitudes of the pilot symbols belonging to the first and second sub-sequences in the composite signal; and processing the first and second magnitudes so as to compute the relative beamforming phase.

There is additionally provided, in accordance with an embodiment of the present invention, a method for communication, including:

receiving first and second combinations of first and second Radio Frequency (RF) signals transmitted from respective first and second transmitters, and processing the first and second combinations to produce respective first and second received signals, the RF signals having a relative beamforming phase therebetween, the first RF signal including a first sequence of first pilot symbols, and the second RF signal including a second sequence of second pilot signals, such that each first pilot signal is transmitted concurrently with a corresponding second pilot signal, each of the first and second sequences includes at least first and second interleaved sub-sequences, such that each of the first pilot symbols in the first sub-sequence has a first phase offset relative to the corresponding second pilot signal, and each of the first pilot symbols in the second sub-sequence has a second phase offset, which is different from the first phase offset, relative to the corresponding second pilot signal;

combining the first and second received signals to produce a composite signal, and measuring respective first and second magnitudes of the pilot symbols belonging to the first and second sub-sequences in the composite signal; and processing the first and second magnitudes so as to compute the relative beamforming phase.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for measuring and correcting phase offsets in a MIMO communication system, in accordance with an embodiment of the present invention;

FIG. 3 is a diagram that schematically illustrates signals transmitted in a MIMO communication system, in accordance with an embodiment of the present invention; and FIG. 4 is a flow chart that schematically illustrates a method for measuring and correcting beamforming errors in a MIMO communication system, in accordance with another embodiment of the present invention.

DETAILED DESCRIPTION OF EMBODIMENTS

Overview

Figure 1:
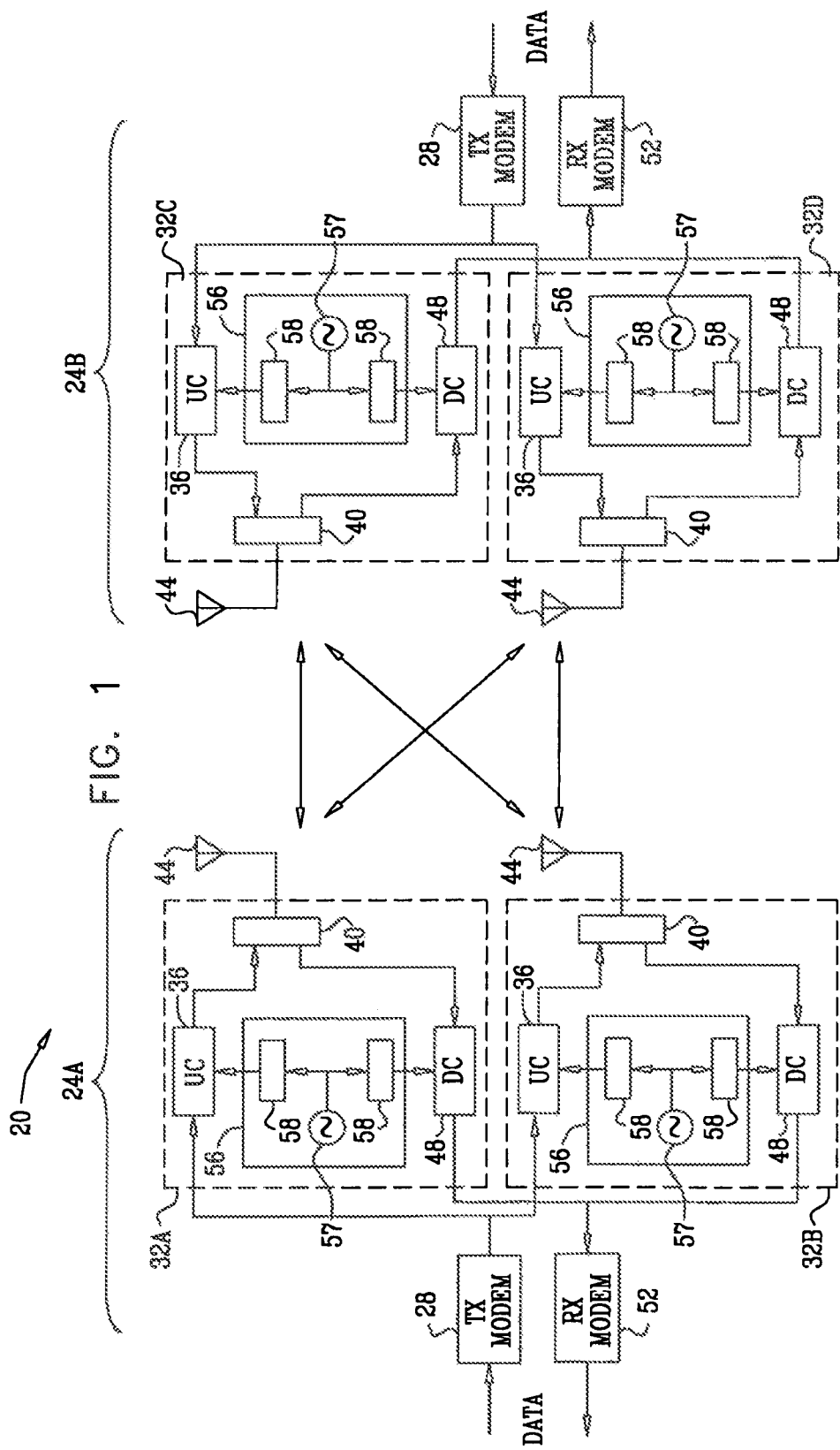
FIG. 1 is a block diagram that schematically illustrates a Multiple-Input Multiple-Output (MIMO) communication system, in accordance with an embodiment of the present invention.

Embodiments of the present invention provide improved methods and systems for estimating and correcting error components in the phase and/or frequency offsets between transmitters of a beamforming MIMO system.

In some embodiments that are described hereinbelow, a bidirectional MIMO communication system comprises two stations that exchange data over a forward channel and a reverse channel. A given station comprises two or more transmitters (which transmit over one of the channels) and two or more receivers (which receive over the opposite channel). In some system configurations, undesired phase/frequency offsets that are introduced by the receivers in a given station are indicative of the undesired phase/frequency offsets introduced by the transmitters of the same station. Such dependence occurs, for example, when the transmitter and receiver connected to each antenna use Local Oscillator (LO) signals that are locked to a common reference.

Some methods that are disclosed herein use this dependence to adjust the phase/frequency offsets of the transmitters. In accordance with these methods, a given station measures the phase/frequency offset between signals received by its receivers, and corrects the phase/frequency of the signals transmitted by its transmitters as a function of the measured offset. When using these methods, each station performs receiver measurements and adjusts the transmitted signals locally, independently of the other station. These methods are particularly effective in stations whose transmitters use LO signals that are unsynchronized with one another. Such systems often have high levels of differential phase noise, which is canceled out by the disclosed methods.

In other disclosed methods, a transmitting station interleaves sequences of pilot symbols in the signals transmitted via the different transmit antennas. Each pilot symbol sequence comprises two or more sub-sequences that are interleaved with one another along the signal. Within each sub-sequence, corresponding pilot symbols in the different signals have a certain phase difference with respect to one another, and this phase difference differs from one sub-sequence to another. A receiving station receives the signals via multiple receive antennas and combines them, using a technique such as Maximum Ratio Combining, to produce a composite signal.

Corresponding pilot symbols in the different received signals are combined in the composite signal in accordance with their relative phases. As will be explained below, the error in the beamforming phase used by the transmitters can be derived from the ratios between the magnitudes of the pilot symbols in the different sub-sequences, as measured in the composite signal. The receiving station measures the magnitudes of the pilot symbols in the composite signal, and compares the average pilot magnitudes in the different sub-sequences. Using the comparison results, the receiving station estimates the error in the beamforming phase. The estimation results are fed back to the transmitting station in order to adjust the beamforming phase between the transmitters.

System Description

FIG. 1 is a block diagram that schematically illustrates a Multiple-Input Multiple-Output (MIMO) communication system 20, in accordance with an embodiment of the present invention. System 20 comprises two stations 24A and 24B, also referred to as endpoints or terminals, which exchange data with one another. System 20 may comprise, for example, a microwave or millimeter-wave link or any other suitable communication system. The description that follows refers to transmission from station 24A to station 24B for the sake of clarity. Typically, however, communication between the stations is bidirectional and each station comprises both transmitters and receivers.

Station 24A comprises a transmit (TX) modem 28, which accepts input data for transmission, modulates the data to produce a stream of digital samples and converts the samples to an analog baseband or Intermediate Frequency (IF) signal. In some embodiments, the TX modem produces a complex baseband signal, i.e., a signal comprising separate In-phase and Quadrature (I/Q) components. The splitting into the I and Q components is typically performed in the digital domain. The term "baseband signal" is thus used herein to describe any real or complex low-frequency signal that is produced by the modem, including IF signals.

The analog baseband signal is provided to two transmitters/receivers (transceivers) 32A and 32B. In each transceiver, the analog signal is processed by an up-converter (UC) 36, also referred to as a transmitter, which up-converts the analog baseband signal to a suitable Radio Frequency (RF). UC 36 typically filters the signal and amplifies it to the appropriate transmission power. The output of UC 36 is filtered by a duplexer 40 and transmitted toward station 24B by an antenna 44.

Station 24A applies beamforming methods using its two transceivers in order to transmit a directional, high-gain signal toward station 24B. Typically, the TX modem provides transceivers 32A and 32B with respective baseband signals that are phase-shifted replicas of one another. Therefore, the two RF signals transmitted via the two antennas of station 24A are intended to convey the same waveform, except for a certain phase offset. The phase offset between the two transmitted RF signals is set so as to combine constructively in the direction of station 24B, i.e., to form a directional signal that is directed toward the other endpoint of the link. The phase difference that is introduced between the two RF signals in order to direct the signal toward station 24B is referred to herein as the beamforming phase.

In station 24B, the signals transmitted from station 24A are received by two antennas 44 of transceivers 32C and 32D. Each antenna of station 24B receives a certain combination of the two transmitted signals. Each of transceivers 32C and 32D processes the received signal combination to produce a respective baseband analog signal. In each transceiver of station 24B, the RF signal is fed via a duplexer 40 to a down-converter (DC) 48, also referred to as a receiver. The DC down-converts the RF signal to baseband or to IF, and typically carries out additional functions such as filtering and/or gain control. Again, the term "baseband" used herein refers to any low-frequency signal that is provided to the RX modem, including IF signals.

The two received baseband signals are provided to a joint demodulator 52, which is also referred to herein as a receive (RX) modem. In the present example, the joint demodulator comprises a Maximum Ratio Combining (MRC) receiver. (Analog to digital conversion may be carried out either by each individual transceiver or by the joint demodulator.) Demodulator 52 jointly processes the two received baseband signals, so as to reconstruct the data that was transmitted from station 24A. The reconstructed data is provided as output.

Each of transceivers 32A . . . 32D comprises a Local Oscillator (LO) source 56. The LO source in a given transceiver produces one or more LO signals and provides the LO signals to UC 36 and DC 48 of the transceiver. In some embodiments, the LO frequencies used for up- and down-conversion are different. In these embodiments, LO source 56 typically comprises two LO generation circuits, such as Phase-Locked Loops (PLLs) 58, which are locked to a common reference clock 57.

The UC and DC respectively perform up-conversion and down-conversion using the LO signals produced by source 56. The different LO signals produced by a given LO source 56 are typically locked to a common reference clock signal. For example, the LO source may comprise a reference clock oscillator and one or more synthesized frequency sources. The synthesized frequency sources produce LO signals that are locked to the output of the common reference clock oscillator.

As noted above, the two RF signals transmitted from transceivers 32A and 32B are intended to comprise phase-shifted replicas of one another. The TX modem of station 24A typically introduces an intentional phase offset between the two RF signals. This intentional phase offset (which is also referred to as a beamforming offset) is calculated so as to cause the two signals to combine and form a directional RF signal that is directed toward station 24B.

In practice, however, additional undesired phase and/or frequency offsets may exist between the two transmitted RF signals. Such undesired offsets may be caused, for example, by phase and/or frequency offsets between the LO signals that are used for performing up-conversion in transceivers 32A and 32B.

In some implementations, the up-converter LO signals in the two transmitters of station 24A are not locked to a common reference clock. In these implementations, both frequency and phase offsets may exist between the transmitted signals. For example, in some implementations of station 24A, transceivers 32A and 32B are mounted in respective Outdoor Units (ODUs), i.e., in separate units. In such implementations, physically distributing a common reference clock to the different ODUs may be impractical. When the LO signals used for up-conversion in the two transceivers are not synchronized with one another, the phase and/or frequency offsets between them introduce undesired offsets between the two transmitted RF signals.

Even in configurations in which the up-converter LO signals are locked to a common reference, there may still exist phase differences (differential phase noise) between the two up-converter LOs because of noise produced in the different LO generation circuits. Such noise may be generated, for example, by frequency dividers, Voltage-Controlled Oscillators (VCOs) and/or Phase Detectors (PDs) in the LO generation circuits. In alternative embodiments, the up-converter LO signals are synchronized (e.g., produced by the same LO generation circuit), in which case the frequency and phase offsets may be negligible.

Embodiments of the present invention provide improved methods and systems for estimating and correcting phase and/or frequency offsets between transmitters of a beamforming MIMO system. Although the embodiments described herein refer to a configuration of two transmitters and two receivers, the methods and systems described herein can be used in MIMO systems having any desired number of transmitters and receivers. The number of transmitters may be equal to or different from the number of receivers.

The description below refers to estimation and correction of phase offsets, differential phase noise and frequency offsets. Since phase and frequency offsets are interrelated, estimation and/or correction of such offsets may be carried out using either the phase or the frequency of the signals. In the context of the present application and in the claims, all of these terms may be used interchangeably.

Reciprocal Frequency Offset Correction

FIG. 2 is a flow chart that schematically illustrates a method for measuring and correcting frequency offsets in MIMO communication system 20, in accordance with an embodiment of the present invention. The method of FIG. 2 uses the fact that the LO signals used by the up-converter and down-converter in a given transceiver are often derived from a common reference, and therefore have similar phase noise. For example, in the configuration of FIG. 1 above, UC 36 and DC 48 in a given transceiver 32 are provided by LO signals that are produced by the same LO source 56 and are locked to a common reference clock.

In a given endpoint 24, when the LO signals of the transmitter and receiver in each transceiver 32 are synchronized to a common reference, the phase offset between the two transmitters is correlative with the phase offset between the two receivers. Thus, the undesired phase offset (error component) between the two transmitters of a given endpoint can be estimated and corrected based on a measurement of the phase difference between the two receivers of the same endpoint. Note that the measurement is performed on signals in one link direction (denoted the forward channel), and correction is performed on the signals in the opposite link direction (denoted the reverse channel).

Consider, for example, the configuration of FIG. 1 above. The baseband signal produced by the TX modem of station 24A is denoted s. The RF signal transmitted by UC 36 of transceiver 32A can be written as $s \cdot e^{j\phi_1}$, and the RF signal transmitted by UC 36 of transceiver 32B can be written as $s \cdot e^{j\phi_2}$. The difference $\phi_1 \ldots \phi_2$ comprises both the desired beamforming phase and an undesired phase error. The two RF signals are transmitted toward station 24B.

The channel response between the two antennas of station 24A and the two antennas of station 24B is defined by four phases denoted $\alpha_1 \ldots \alpha_4$, which are typically determined by the link geometry. The channel responses between the four possible transmitter-receiver pairs are given in the following table:

| | |
|---|---|
| 32A → 32C | $e^{j\alpha_1}$ |
| 32A → 32D | $e^{j\alpha_3}$ |
| 32B → 32C | $e^{j\alpha_2}$ |
| 32B → 32D | $e^{j\alpha_4}$ |

Let $e^{j\psi_1}$ and $e^{j\psi_2}$ denote the phase noise that is introduced by the receivers of transceivers 32C and 32D, respectively. The baseband signal produced by transceiver 32C is given by $$r_1 = s \cdot (e^{j(\phi_1 + \alpha_1)} + e^{j(\phi_2 + \alpha_2)}) \cdot e^{j\psi_1} \quad [1]$$

The transmitters of transceivers 32A and 32B and the receiver of transceiver 32C can be viewed as a dual-transmitter single-receiver system whose channel coefficients are given by $$H_1 = (e^{j(\phi_1 + \alpha_1)} + e^{j(\phi_2 + \alpha_2)}) e^{j\psi_1} \quad [2]$$
$$= 2 e^{j\left(\frac{\phi_1 + \phi_2 + \alpha_1 + \alpha_2}{2} + \psi_1\right)} \cos\left(\frac{\phi_1 - \phi_2 + \alpha_1 - \alpha_2}{2}\right)$$

-continued $$H_2 = (e^{j(\varphi_1+\alpha_3)} + e^{j(\varphi_2+\alpha_4)})e^{j\psi_2}$$
$$= 2e^{j\left(\frac{\varphi_1+\varphi_2+\alpha_3\alpha_4}{2}+\psi_2\right)}\cos\left(\frac{\varphi_1-\varphi_2+\alpha_3-\alpha_4}{2}\right)$$

The phase difference between the baseband signals produced by the receivers of transceivers 32C and 32D can be written as $$\text{Angle}(H_1 \cdot H_2^*) \qquad [3]$$

The method of FIG. 2 begins with demodulator 52 of station 24B measuring the phase offset between the baseband signals received by the receivers of transceivers 32C and 32D, at a forward channel phase measurement step 60. For example, the demodulator may track the phase difference using a differential Phase-Locked Loop (PLL), which evaluates $$\frac{(H_1 \cdot H_2^*)}{\text{ABS}(H_1 \cdot H_2^*)} = e^{j\left(\frac{\alpha_1-\alpha_3+\alpha_2-\alpha_4}{2}+\psi_1-\psi_2\right)} \qquad [4]$$

Since the LO signals in the transmitter and receiver in each transceiver are locked to a common reference, the receive phase noise of a given transmitter is indicative of the transmit phase noise of the transceiver. Therefore, the measured differential phase noise between the two receivers of station 24B is indicative of the differential phase noise between the two transmitters of the same station.

Using this relationship, demodulator 52 of station 24B calculates a phase correction factor to be applied to the transmitters of station 24B based on the measured phase difference between the two received signals, at a correction calculation step 64. When the forward and reverse channels use different transmission frequencies, the function may account for this difference, such as by scaling the measured phase difference by the ratio between transmission frequencies of the forward and reverse channels.

In some embodiments, the phase difference measured between the receivers is indicative of the overall beamforming phase to be applied to the transmitters, not only of the correction factor that compensates for the differential phase noise between transmitters. In these embodiments, the phase difference measured between the receivers accounts for both the undesired component that is related to phase noise and the phase difference that is related to the link geometry. For example, when the demodulator calculates the phase correction factor as a function of the phase difference given by Equation [4] above, the term $$e^{j\left(\frac{\alpha_1-\alpha_3+\alpha_2-\alpha_4}{2}\right)}$$

already accounts for the link geometry. Thus, the measured phase between the receivers of station 24B can be used to calculate the overall phase difference to be applied between the transmitters of station 24B.

TX modem 28 of station 24B applies the phase correction calculated at step 64 above, at a reverse channel correction step 68. The TX modem applies the correction by controlling the phase difference between the baseband signals provided to the transmitters of transceivers 32C and 32D.

The description above refers to demodulator 52 as performing the correction calculation. Alternatively, the correction calculation may be carried out by the TX modem of station 24B based on the measurements performed by the demodulator. In some embodiments, the joint demodulator and the TX modem are embodied in a single modem, and a processor of this modem calculates and applies the appropriate correction. Thus, in the context of the present patent application and in the claims, the joint demodulator (sometimes assisted by the TX modem) of a given link endpoint is viewed as a phase correction unit, which measures the phase difference between received signals, calculates the appropriate phase correction and applies the correction to the transmitted signals in the opposite link direction. The two receivers and the phase correction unit are viewed as a reception subsystem.

The process described above enables the modem to compute and apply phase offset corrections in very short time intervals, and thus provides an extremely fast closed-loop phase noise correction mechanism.

In alternative embodiments, the phase offset between the received signals can be measured using any suitable method, and the phase correction to be applied to the transmitters of the reverse channel can be calculated by applying any suitable function to the phase offset measured between the received signals.

Frequency/Phase Offset Correction Based on Pilot Symbols

Communication systems often use pilot symbols, i.e., symbols whose data is known a-priori to the receiver. The transmitter inserts pilot symbols into the sequence of transmitted symbols at known locations, often at regular intervals, and the receiver receives and performs measurements on the pilot symbols.

In some embodiments of MIMO system 20, TX modem 28 of a given station inserts pilot symbols into the baseband signals provided to the two transmitters. Joint demodulator 52 of the other station receives and processes the pilot symbols in order to estimate the beamforming error, i.e., the deviation of the phase offset between the two transmitters from the optimal value.

FIG. 3 is a diagram that schematically illustrates signals transmitted in system 20, in accordance with an embodiment of the present invention. The figure shows two baseband signals 80 and 84, which are produced by TX modem 28 of station 24A. Signal 80 is transmitted by UC 36 of transceiver 32A, and signal 84 is transmitted by UC of transceiver 32B. Signals 80 and 84 comprise parallel sequences of pilot symbols 88, which are distributed along the signals.

The pilot symbols are divided into subsets. Each subset comprises a sub-sequence of pilot symbols, and the different sub-sequences are interleaved with one another along the signal. Each subset is characterized by the relative phase shift between corresponding pilot symbols in the two baseband signals (i.e., between the pilot symbols that are transmitted concurrently in the two signals). In the example of FIG. 3, three subsets are defined: Some of the corresponding pilot symbols have the same phase (0°,0°), others have a +90° shift (0°,+90°) and others have a −90° shift (0°,−90°). Symbols other than the pilot symbols (denoted DATA in the figure) are duplicated in the two baseband signals. The scheme of FIG. 3 can be implemented, for example, by rotating every second pilot symbol in one of the baseband signals by +90° or by −90°.

The TX modem applies a certain beamforming phase to the two baseband signals, and transceivers 32A and 32B produce and transmit the corresponding RF signals toward station 243. Transceivers 32C and 32D receive the signals, and joint demodulator 52 of station 24B performs Maximum Ratio Combining (MRC) on the two received signals to produce a single composite signal.

As will be shown below, the ratios between the average magnitudes of the pilot symbols in the different subsets, as measured in the composite signal, are indicative of the deviation of the beamforming phase used by the transmitters from its optimal value. For example, when the beamforming phase is optimal, the magnitude of the pilot symbols of the (0°,+90°) subset will be similar to the magnitude of the pilot symbols of) the (0°,−90°) subset, when measured in the composite signal after MRC.

In some embodiments, joint demodulator 52 of station 24B measures and compares the average magnitudes of the pilot symbols of the different subsets in the composite signal, and uses these measurements to estimate the deviation of the beamforming phase from its optimal value. Equivalently, the demodulator may estimate a phase correction to be applied to the beamforming phase in order to reach the optimal value. The estimation result is transmitted over the reverse channel to station 24A, in order to adjust the beamforming phase used by the transmitters.

Following the notation of Equations [1]-[2] above, assume that beamforming is applied by multiplying the signal transmitted by transceiver 32B by $e^{-j\alpha}$, wherein $\alpha$ denotes the beamforming phase. Thus, $r_1$ and $r_2$ (the RF signals received at the antennas of transceivers 32C and 32D, respectively) can be written as $$r_1 = 2e^{j\left(\frac{\varphi_1+\varphi_2+\alpha_1+\alpha_2-\alpha}{2}+\psi_1\right)}\cos\left(\frac{\varphi_1-\varphi_2+\alpha_1-\alpha_2+\alpha}{2}\right) \quad [5]$$

$$r_2 = 2e^{j\left(\frac{\varphi_1+\varphi_2+\alpha_3+\alpha_4-\alpha}{2}+\psi_2\right)}\cos\left(\frac{\varphi_1-\varphi_2+\alpha_3-\alpha_4+\alpha}{2}\right)$$

The composite signal produced by demodulator 52 of station 24B is given by $$r_{MRC} = r_1 \cdot h_1^* + r_2 \cdot h_2^* \quad [6]$$

wherein $h_1^*$ and $h_2^*$ denote MRC weights. It can be shown that the optimal value of $\alpha$ is given by $$\alpha_{OPT} = -\left(\varphi_1 - \varphi_2 + \frac{\alpha_1-\alpha_2+\alpha_3-\alpha_4}{2}\right) \quad [7]$$

The beamforming phase can thus be written as $$\alpha = \alpha_{OPT} + \delta \quad [8]$$

wherein $\delta$ denotes the deviation of the beamforming phase from its optimal value. The composite signal can be written as $$r_{MRC} = \cos\left(\frac{\alpha_1-\alpha_2-(\alpha_3-\alpha_4)}{4} - \frac{\delta}{2}\right)\cos\left(\frac{\alpha_1-\alpha_2-(\alpha_3-\alpha_4)}{4}\right) + \quad [9]$$
$$\cos\left(\frac{\alpha_3-\alpha_4-(\alpha_1-\alpha_2)}{4} - \frac{\delta}{2}\right)\cos\left(\frac{\alpha_3-\alpha_4-(\alpha_1-\alpha_2)}{4}\right)$$

Let $\phi = \alpha_3 - \alpha_4$ and $\psi = \alpha_1 - \alpha_2$. The composite signal can now be written as $$r_{MRC} = \cos\left(\frac{\varphi-\psi}{4}-\frac{\delta}{2}\right)\cos\left(\frac{\varphi-\psi}{4}\right) + \cos\left(\frac{\psi-\varphi}{4}-\frac{\delta}{2}\right)\cos\left(\frac{\psi-\varphi}{4}\right) \quad [10]$$

$$= \left(\cos\left(\frac{\varphi-\psi}{4}-\frac{\delta}{2}\right) + \cos\left(\frac{\psi-\varphi}{4}-\frac{\delta}{2}\right)\right)\cos\left(\frac{\psi-\varphi}{4}\right)$$

or $$r_{MRC} = 4\cos\left(\frac{\delta}{2}\right)\cos\left(\frac{\psi-\varphi}{4}\right)^2 \quad [11]$$

Equation [11] gives the composite signal magnitude during symbols whose phases are not rotated between the two baseband signals (e.g., in the data symbols and in the pilot symbols of the (0°,0°) subset). The composite signal magnitude during the rotated pilot symbols of the (+90°,0°) and (−90°, 0°) subsets is given by $$r_{MRC,RP1} = 4\cos\left(\frac{\pi}{4}+\frac{\delta}{2}\right)\cos\left(\frac{\psi-\varphi}{4}\right)^2 \quad [12]$$

$$r_{MRC,RP2} = 4\cos\left(\frac{\pi}{4}-\frac{\delta}{2}\right)\cos\left(\frac{\psi-\varphi}{4}\right)^2$$

The ratio between the magnitudes of the composite signal over the two subsets of rotated pilot symbols is given by $$\frac{r_{MRC,RP1} - r_{MRC,RP2}}{r_{MRC}} = \frac{-2\sin\left(\frac{\delta}{2}\right)\sin\left(\frac{\pi}{4}\right)}{\cos\left(\frac{\delta}{2}\right)} \quad [13]$$

$$= -2\sin\left(\frac{\pi}{4}\right)\tan\left(\frac{\delta}{2}\right)$$

As can be seen in Equation [13], the ratio depends only on the deviation $\delta$.

FIG. 4 is a flow chart that schematically illustrates a method for measuring and correcting beamforming errors in MIMO communication system 20, in accordance with another embodiment of the present invention. The method begins with TX modem 28 of station 24A producing two baseband signals, at a baseband signal generation step 90. As explained above, the baseband signals comprise respective sequences of pilot symbols, which are divided into subsets or sub-sequences. In each subset, corresponding pilot symbols in the two baseband signals have a certain phase offset, which differs between different subsets. For example, in the configuration of FIG. 3 above, three subsets of pilot symbols are defined, having phase offsets of 0°, +90° and −90°. Alternatively, the phase offsets may comprise 0°, +φ° and −φ°, for any suitable value of φ.

Alternatively, any other suitable number of subsets and/or any other suitable set of phase offsets can be used. The pilot symbols of the different subsets may be distributed over time in any suitable order or distribution. In some embodiments, the pilot symbols comprise Quaternary Phase Shift Keying (QPSK) symbols, and the pilot symbols in the different subsets are rotated by different integer multiples of 90°, such as by ±90°. This choice is sometimes preferable since rotation of QPSK symbols by ±90° remains within the QPSK constellation. Alternatively, the pilot symbols may be selected from any other suitable signal constellation.

The TX modem provides the two baseband signals to transceivers 32A and 32B, respectively. UC 36 of the transceivers up-convert the baseband signals to RF and transmit the RF signals toward station 24B, at a transmission step 94.

Station 24B receives the transmitted RF signals, at a reception step 98. Each of transceivers 32C and 32D receives the transmitted RF signals, and DC 48 of the transceivers down-convert the received signals to baseband. Joint demodulator 52 of station 24B combines the two received baseband signals using Maximum Ratio Combining, and produces a composite signal.

Demodulator 52 of station 24B measures the absolute magnitudes of the pilot symbols in the composite signal, at a pilot measurement step 102. The demodulator measures the average pilot magnitude within each of the pilot symbol subsets defined above. In the exemplary configuration of FIG. 3, the demodulator calculates three average magnitudes—over the (0°,0°), (+90°,0°) and (−90°,0°) subsets.

The demodulator then estimates the beamforming phase used by the transmitters (or the deviation from optimal beamforming phase), based on the measured pilot signal magnitudes, at a beamforming phase estimation step 106. In some embodiments, the demodulator estimates the beamforming phase deviation using Equation [13] above. When measuring the absolute values of the pilot symbol magnitudes, Equation [13] becomes $$\frac{\|r_{MRC,RP1}\| - \|r_{MRC,RP2}\|}{\|r_{MRC}\|} = 2\sin\left(\frac{\pi}{4}\right)\tan\left(\frac{\delta}{2}\right) \quad [14]$$

Alternatively, demodulator 52 may use any other method for estimating the beamforming phase deviation based on the pilot symbol magnitudes in the different subsets.

Station 24B notifies station 24A of the estimated beamforming phase deviation, at a feedback step 110. In some embodiments, station 24B transmits the estimation results over the reverse channel. TX modem 28 of station 24A is notified of the beamforming phase deviation, and uses this information to adjust the beamforming phase it introduces between the two baseband signals it produces.

Equivalently, station 24B may provide station 24A with the absolute value of the desired beamforming phase, a desired correction factor to be applied to the beamforming phase, or any other indication that enables station 24A to adjust its transmitter beamforming phase.

Thus, using the method of FIG. 4, station 24A may continuously adapt the beamforming phase used by its transmitters based on the measurements performed by station 24B. As a result, station 24A can adaptively direct the transmitted RF signal toward station 24B in the presence of changes in channel response and phase/frequency deviations in the transmitters or receivers.

In the description of FIGS. 3 and 4, generation of the different baseband signals is carried out by TX modem 28, and processing of the pilot symbols and estimation of the beamforming phase is carried out by demodulator 52. Generally, however, the functions of the TX modem can be carried out by any suitable transmission baseband circuitry, and the functions of the demodulator can be carried out by any suitable reception baseband circuitry. Thus, in the context of the present patent application and in the claims, the TX modem is regarded as a type of transmission baseband unit, which carries out the functions described herein. Similarly, the demodulator is regarded as a type of reception baseband unit, which carries out the functions described herein Although the description of FIGS. 3 and 4 addresses a system in which different transceivers use different and independent LO signals, this configuration is used purely for the sake of conceptual clarity. The pilot-based methods described herein are in no way limited to such system configurations. These methods may be used in other system configurations in which some or all transceivers in a given station share common LO signals, and/or in system configurations in which up-conversion and down-conversion in a given transceiver are performed using independent LO signals.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication system, comprising:
   transmission baseband circuitry configured to produce first and second baseband signals having a first beamforming phase offset therebetween, the first baseband signal including a first sequence of first pilot symbols, and the second baseband signal including a second sequence of second pilot symbols, each first pilot symbol being configured to be transmitted concurrently with a corresponding second pilot symbol, wherein
   at least one of the first sequence and the second sequence includes a first interleaved sub-sequence of interleaved pilot symbols and a second interleaved sub-sequence of interleaved pilot symbols, each of the interleaved pilot symbols in the first interleaved sub-sequence having a first phase offset relative to another interleaved pilot symbol in the first interleaved sub-sequence, and each of the interleaved pilot symbols in the second interleaved sub-sequence having a second phase offset relative to another interleaved pilot symbol in the second interleaved sub-sequence, the first phase offset being different than the second phase offset.

2. The communication system according to claim 1, further comprising:
   first and second transmitters configured to respectively process the first and second baseband signals to produce first and second Radio Frequency (RF) signals, and to respectively transmit the first and second RF signals.

3. The communication system according to claim 2, further comprising:
   first and second receivers configured to respectively produce first and second received signals based on the first and second RF signals; and
   reception baseband circuitry configured to combine the first and second received signals to produce a composite signal, to measure respective magnitudes of the interleaved pilot symbols included in the first and second interleaved sub-sequences in the composite signal, to process the measured first and second magnitudes to compute a second beamforming phase offset, and to provide the second beamforming phase offset to the transmission baseband circuitry to correct an error included in the first beamforming phase offset.

4. The communication system according to claim 3, wherein the reception baseband circuitry is configured to combine the first and second received signals by applying Maximum Ratio Combining (MRC).

5. The communication system according to claim 1, wherein
   the first phase offset comprises ¢ degrees,
   the second phase offset comprises −¢ degrees, and at least one of the first and second sequences further comprises a third interleaved sub-sequence, each of the pilot symbols in the third sub-sequence having no phase offset with respect to another pilot symbol in the third interleaved sub-sequence.

6. The communication system according to claim 3, wherein the reception baseband circuitry includes a Differential Phase-Locked Loop (DPLL) configured to measure the first beamforming phase offset.

7. The communication system of claim 2, wherein the first and second transmitters respectively include first and second Local Oscillator (LO) generation units configured to produce respective first and second LO signals which are unsynchronized with respect to each other, the first and second transmitters being configured to produce the first and second RF signals based on the first and second LO signals.

8. The communication system of claim 2, wherein the first and second transmitters respectively include first and second Local Oscillator (LO) generation units configured to produce respective first and second LO signals which are locked to a common reference clock signal, the first and second transmitters being configured to produce the first and second transmitted RF signals based on the first and second LO signals.

9. The communication system according to claim 1, wherein a difference between the first phase offset and the second phase offset is 90°.

10. The communication system according to claim 1, wherein the communication system is configured to operate as a multi-input multi-output (MIMO) system.

11. A communication method to be used in a communication device, the method comprising:
producing, in the communication device, first and second baseband signals having a first beamforming phase offset therebetween, the first baseband signal including a first sequence of first pilot symbols, and the second baseband signal including a second sequence of second pilot symbols; and
transmitting, from the communication device, each first pilot symbol concurrently with a corresponding second pilot symbol, wherein at least one of the first and second sequences includes a first interleaved sub-sequence of interleaved pilot symbols and a second interleaved sub-sequence of interleaved pilot symbols, each of the interleaved pilot symbols in the first interleaved sub-sequence having a first phase offset relative to another interleaved pilot symbol in the first interleaved sub-sequence, and each of the interleaved pilot symbols in the second interleaved sub-sequence having a second phase offset relative to another interleaved pilot symbol in the second interleaved sub-sequence, the first phase offset being different than the second phase offset.

12. The method of claim 11, further comprising:
processing the first and second baseband signals to respectively produce first and second Radio Frequency (RF) signals; and
respectively transmitting the first and second RF signals.

13. The method of claim 12, further comprising:
respectively producing first and second received signals based on the first and second RF signals;
combining the first and second received signals to produce a composite signal;
measuring respective magnitudes of the interleaved pilot symbols included in the first and second interleaved sub-sequences in the composite signal; and
processing the measured first and second magnitudes to compute a second beamforming phase offset to correct an error included in the first beamforming phase offset.

14. The method according to claim 13, wherein the combining includes combining the first and second received signals by applying Maximum Ratio Combining (MRC).

15. The method according to claim 11, wherein
the first phase offset comprises ¢ degrees,
the second phase offset comprises −¢ degrees, and
at least one of the first and second sequences further comprises a third interleaved sub-sequence, each of the pilot symbols in the third sub-sequence having no phase offset with respect to another pilot symbol in the third interleaved sub-sequence.

16. The method according to claim 13, further comprising:
measuring the first beamforming phase offset using a Differential Phase-Locked Loop (DPLL).

17. The method according to claim 12, wherein the processing comprises:
generating, in first and second Local Oscillator (LO) units, first and second LO signals which are unsynchronized with respect to each other, and
producing the first and second RF signals based on the first and second LO signals.

18. The method according to claim 12, wherein the processing comprises:
generating, in first and second Local Oscillator (LO) units, first and second LO signals which are locked to a common reference clock signal, and
producing the first and second RF signals based on the first and second LO signals.

19. The method according to claim 11, wherein a difference between the first phase offset and the second phase offset is 90°.

20. A communication system comprising:
transmission baseband circuitry configured to produce first and second baseband signals having a first beamforming phase offset therebetween, the first baseband signal including a first sequence of first pilot symbols, and the second baseband signal including a second sequence of second pilot symbols, each first pilot symbol being configured to be transmitted concurrently with a corresponding second pilot symbol, wherein at least one of the first and second sequences includes a first interleaved sub-sequence of interleaved pilot symbols and a second interleaved sub-sequence of interleaved pilot symbols, each of the interleaved pilot symbols in the first interleaved sub-sequence having a first phase offset relative to another interleaved pilot symbol in the first interleaved sub-sequence, and each of the interleaved pilot symbols in the second interleaved sub-sequence having a second phase offset relative to another interleaved pilot symbol in the second interleaved sub-sequence, the first phase offset being different than the second phase offset; and
reception baseband circuitry configured to measure respective magnitudes of the interleaved pilot symbols included in the first and second interleaved sub-sequences, and to process the measured first and second magnitudes to compute a second beamforming phase offset to correct an error included in the first beamforming phase offset.

* * * * *